INVENTORS
G. SOTEROPULOS
H. E. deBUHR
B. W. GUSTAFSON

INVENTORS
G. SOTEROPULOS
H. E. deBUHR
B. W. GUSTAFSON

# United States Patent Office 3,274,761
Patented Sept. 27, 1966

3,274,761
CROP WAFERING MACHINE
Gust Soteropulos, Harold E. de Buhr, and Blaine W. Gustafson, all of Ottumwa, Iowa, assignors to Deere & Company, Moline, Ill., a corporation of Delaware
Filed Feb. 21, 1964, Ser. No. 346,540
11 Claims. (Cl. 56—1)

This invention relates to an agricultural machine for forming forage crops, such as hay and the like, into wafers, a livestock food in the size range of about ⅞" x ⅞" to 2" x 2" by random lengths of about ¾" to 2" and having a unit density of about 45 to 65 pounds per cubic foot.

A product of this type lends itself more readily to feeding, handle, transporting, storing, etc., than conventional bales, that range in size between the high-density bale of 12" x 14" x 32" and the standard bale of 14" x 18" x 32" having respective unit densities of 16 and 8 pounds per cubic foot. A wafer, unlike a bale which must be tied with wire or twine, retains its form by reliance mainly on internal cohesion resulting from wafering pressures in the range of 3000 to 7500 p.s.i. and upward. Wafers are also to be distinguished from the conventional pellets that are produced in large stationary mills from material that has been pre-treated to a generally granular condition of uniform moisture content, fed to the mill at a carefully controlled uniform rate and compacted and extruded at pressures in the range of 8000 to 14000 p.s.i. so that the end result is extremely small, hard and of uniform texture and typically ⅛" to ⅜" in diameter and ¼" to 1½" in length.

A wafering machine, like an automatic baler is operated over a field of previously cut crops that have been allowed to cure to a relatively low moisture content, which itself presents a problem because the field moisture depends upon such variables as weather, time, crop volume and differences in drying or curing rates between stem and leaves. In the case of baler operation, moisture content is not regarded as extremely critical, since the bales are individually bound or tied. In wafering, however, the moisture factor is significant if quality wafers are to be formed.

Experience has shown that a crop moisture level of about 6% to 12% is acceptable for wafering. Regardless of the crop moisture in the field, which is primarily internal moisture, the crops must be treated with additional moisture to wet the exterior surfaces thereof before they can be wafered. Prior practice has been to add water or an equivalent moisturizing agent to the wafering means itself or to the crop feed means immediately ahead of the wafering means. This method produces poor results, particularly where the picked-up crop stream is preliminarily laterally narrowed and/or chopped, flailed or otherwise subjected to turbulent reducing processes. Also, the time interval between the adding of water and the beginning of wafering is so short that wetting lacks uniformity and liquid is not only wasted but collects in the feed chamber to over-wet portions of the crop and its residues, resulting in soft, soggy wafers and ultimately in slugs that stall the machine.

It is therefore a principal object of the invention to provide a system and means for adding moisture to the crops so as to assure uniform surface wetting, accomplished here by applying the added moisture to the crops while the crop stream moving or to be moved to the wafering means is still relatively wide and unchopped and at a point sufficiently far in advance of the wafering means to allow the added moisture to distribute itself throughout the crop stream. More specifically, the moisture is added just ahead of the crop pick-up means while the crop is mainly supported by the ground so that excess liquid, if the crop stream or windrow happens to be extraordinarily thin, falls to the ground rather than into the interior of the machine. A further advantage in this respect is that the crops, especially if windrowed, will characteristically present predominantly at the top of the window the plant stems which are drier than the buried leaves and which therefore need more wetting.

It is a further object of the invention to prepare the field by cutting the crops and forming them into relatively wide windrows and to apply the moisture as aforesaid over substantially the entire width of the windrow being picked up. Specifically, windrows in widths of 36" to 70" are preferred, and it is still more beneficial if these windrows are formed with a swather or windrower rather than with a side-delivery rake, because the added handling of the crop by a rake contributes to leaf loss.

The invention features the use of improved feed means ahead of the wafering means or die and includes a rotary cutter of the reel or bladed type cooperative with the fixed blade or shear bar to cut the crops into relatively short lengths.

The foregoing and other important objects and desirable features inherent in and encompassed by the invention will become apparent as a preferred embodiment of the invention is disclosed, by way of example, in the ensuing description and accompanying sheets of drawings wherein.

Figure 1:
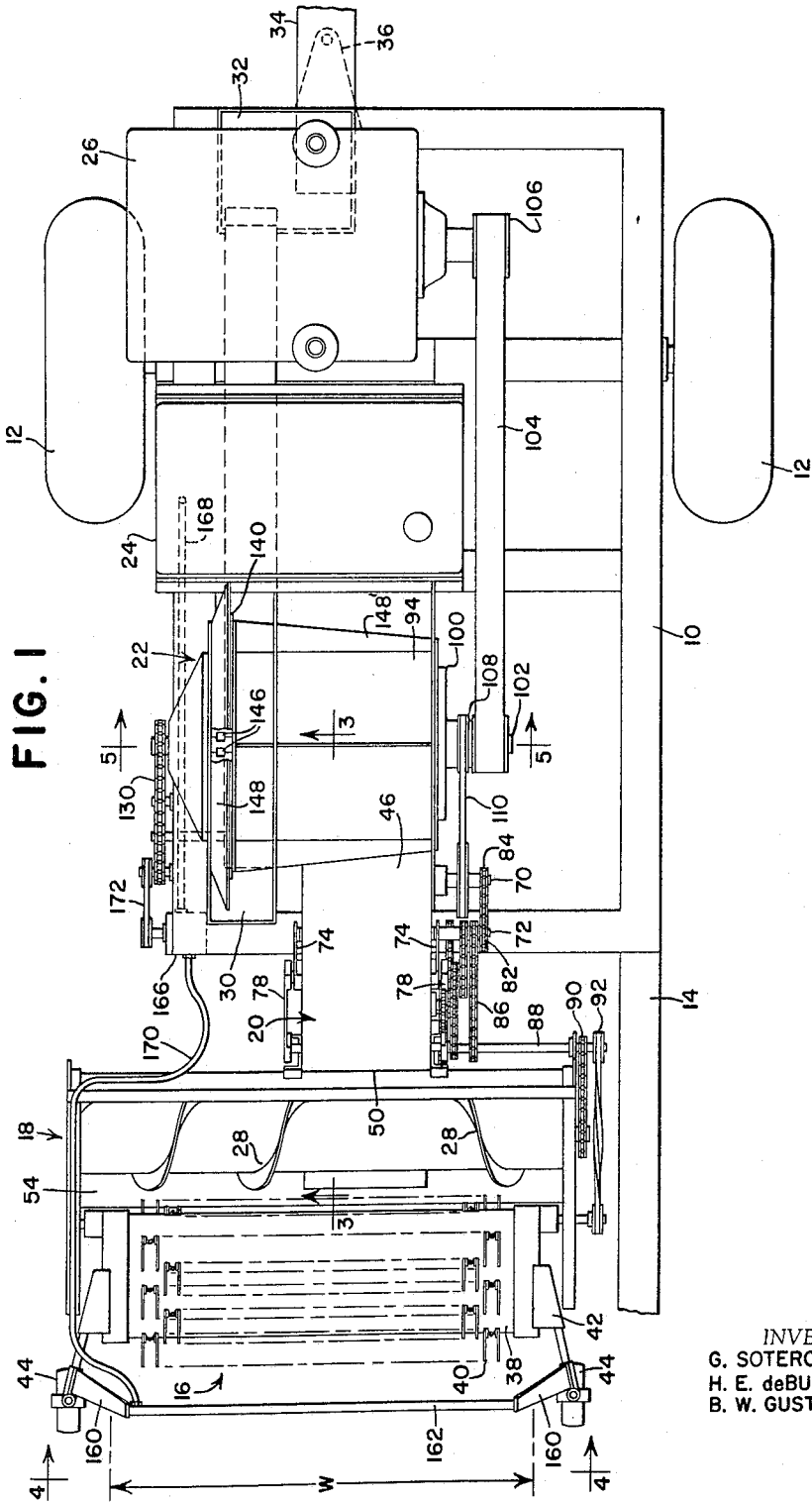
FIG. 1 is a plan view, with portions broken away and other portions shown schematically, of a wafering machine in which the present invention may be embodied.

The machine chosen for purposes of illustration has a mobile main frame 10 carried on wheels 12 and equipped with a forwardly extending tongue 14 for connection to a tractor or similar draft vehicle so that the direction of its advance over the field is to the left as seen by the reader.

The frame carries at its forward end a crop pick-up means 16 which delivers immediately to a crop-narrowing means 18 which in turn delivers the crop to a crop-transfer means 20 just ahead of wafering or die means indicated in its entirety by the numeral 22. Rearwardly of the die means 22 is a liquid container or tank 24 and behind that is a typical internal combustion engine 26. The general operation is such that as the machine advances over the field, it picks up previously cut and at least partially cured crops, preferably from a windrow having a width W (FIG. 1), moving the crops rearwardly over the pick-up means in the form of a relatively wide stream, substantially as wide as the dimension W. The stream is then handled by the narrowing means 18, which comprises a pair of reversely wound augers 28, and thence enters the crop-transfer means 20 for feeding to the die 22 from which the crop emerges as extruded wafers of the character referred to above. The wafers fall from the die means 22 into a rearwardly extending conveyor 30 which delivers to a hopper 32 that feeds in turn to the lower end of an upwardly and rearwardly inclined wagon elevator 34. It is conventional practice to tow behind the wafering machine a trailer or wagon for receiving the wafers from the upper end (not shown) of the wagon elevator. A typical wagon hitch is shown at 36.

The pick-up means 16 may be of any conventional type, preferably being of the character utilizing a belt 38 on which are mounted a plurality of spring fingers 40. The pick up frame, indicated generally at 42, is, in addition to being supported by the frame 10, carried on a pair of caster wheels 44. These are relatively widely spaced so as to straddle or span the windrow W. As previously indicated, the previously cut crops are preferably formed into windrows 36″ to 70″ wide. The effective width of the pick-up means is of a comparable dimension.

Figure 3:
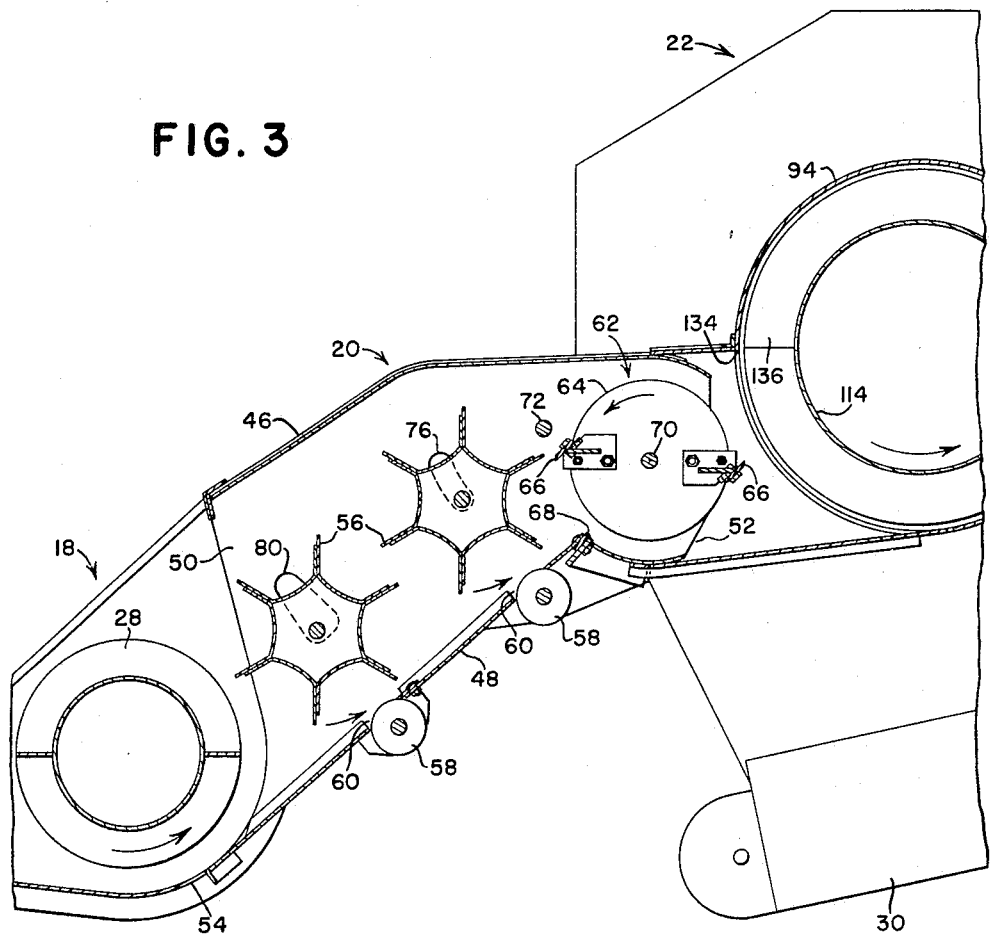
FIG. 3 is an enlarged fragmentary view, mainly in section as seen along the line 3—3 of FIG. 1.

The crop-transfer means 20 comprises a relatively narrow housing 46 having a floor 48 and front and rear ends, the former affording a crop-receiving portion 50 and the latter a crop-delivery portion 52 (FIG. 3). The forward or receiving portion 50 opens to a transverse auger trough 54 in which the double auger 28—28 rotates, the direction of rotation being counterclockwise as shown by the arrow in FIG. 3.

The portion of the crop-transfer means 20 intermediate the forward receiving portion 50 and the rearward delivery portion 52 includes feed means, here a pair of upper feed rolls 56 and a pair of lower feed rolls 58, the floor 48 having a pair of openings 60 therein so that each of the rolls 58 may cooperate with its companion roll 56. The rolls 56 are of the bladed type so as to be relatively aggressive, and they rotate counterclockwise as indicated by the arrows in FIG. 3. The rolls 58 are relatively smooth and rotate in clockwise directions. The two sets of rolls 56–58 cooperate to transfer crops rearwardly uphill over the floor 48 for ultimate exit through the crop delivery portion 52, within which is situated a cutting means, indicated in its entirety by the numeral 62 and comprising a cutter of the bladed or reel type, made up of a rotor 64 carrying a pair of diametrically related transverse blades or knives 66. The upper or rear end of the floor 48 carries a fixed knife or blade 68 with which the rotary blades 66 are cooperative to cut the crops into relatively short lengths, preferably in the order of 1″ to 1½″. This has an advantage over the prior art use of so-called hammer mill cutters which simply chew up the crop and result in leaf loss and maceration to such condition as to interfere with the formation of adequate wafers. The desired length of cut can of course be readily determined by the linear speed of the feed as related to the r.p.m. of the cutter 62.

The cutter 62 is carried by a transverse shaft 70, ahead of which is a parallel shaft 72 for mounting arms 74 which carry the rearward upper feed roll 56 for vertical oscillation to accommodate varying thicknesses of crop stream moving through the means 20. FIG. 3 illustrates an arcuate slot at 76 for confining movement of the feed roll. A second pair of external arms 78 (FIG. 1) carries the forward or lower feed roll 56 for oscillation about the axis of the rear feed roll shaft. FIG. 3 illustrates a slot 80 for guiding movement of the forward feed roll shaft. These are details that could of course be varied according to the particular type of design.

Figure 2:
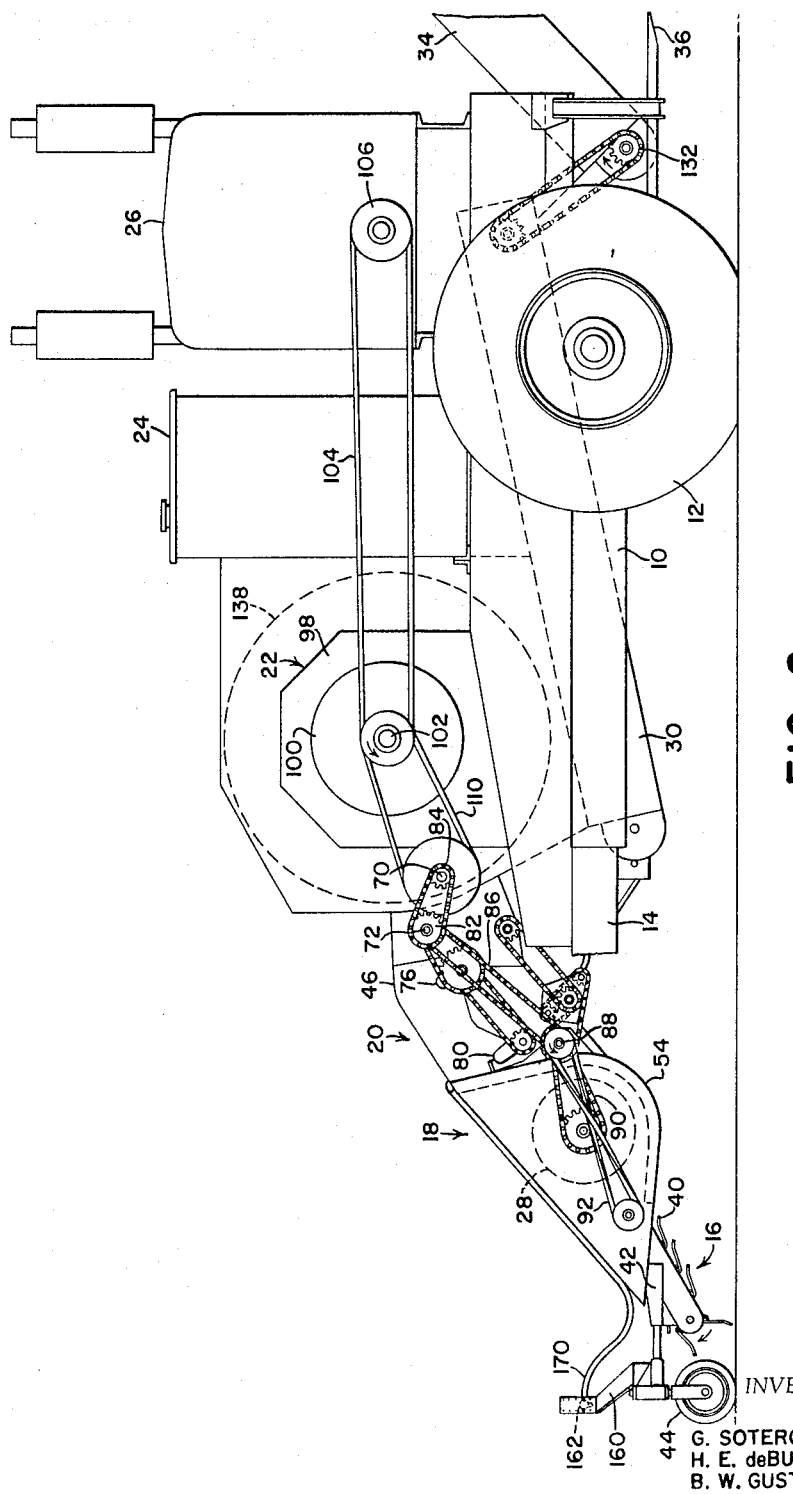
FIG. 2 is a side elevational view of the same.

The shaft 72 also serves to carry externally a sprocket 82 which is chain-and-sprocket driven at 84 from the cutter shaft 70. Chain drives, as shown best in FIGS. 1 and 2, are used to drive the feed rolls 56 and 58. The shaft 72 serves also as the source of a chain drive 86 to a cross shaft 88 from which drive is taken at 90 and 92, respectively, to the augers 28 and pick-up belt 38. Here again, the details could be varied, and the drives shown are merely representative.

The wafering means comprises a cylindrical housing 94 having its axis transverse of the machine and including right and left-hand end walls 96 and 98, the expressions "right" and "left" being used with reference to the position of an observer standing behind the machine and facing forwardly. Accordingly, in FIG. 5, the wall 96 will be at the reader's left and the wall 98 at the right. The wall 98 rigidly carries a support 100 within which, by any suitable means not shown, is appropriately journaled an input shaft 102, driven as by a belt 104 from the output sheave or pulley 106 of the internal combustion engine 26. A narrower sheave 108, keyed to the shaft 102 just inwardly of the wide sheave that carries the belt 104, serves as means, via a belt 110, for driving the shaft 70 and thence the feed rolls etc.

Figure 6:
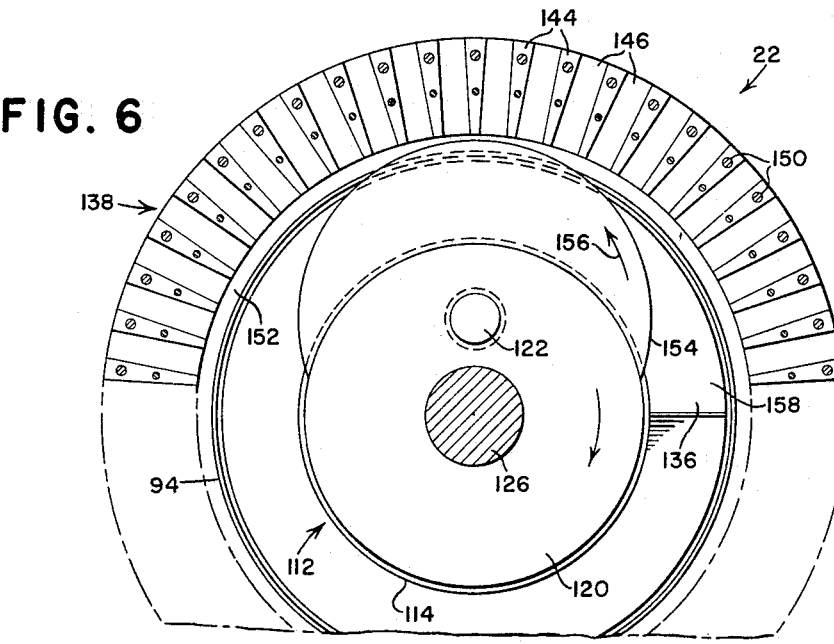
FIG. 6 is a fragmentary view, largely in section as seen along the lines 6—6 of FIG. 5.

Within the cylindrical housing 94 is journaled a rotor structure 112, made up in the first instance by an auger core 114 rotatable on the axis of the shaft 102. This core is hollow and contains therewithin a gear-reduction housing 116, not material here, by means of which the auger core is rotated. The right-hand end of the core carries a circular support 118 which affords one cheek of a crankshaft, the other cheek being shown at 120, and the two cheeks being interconnected by a press wheel shaft 122, eccentric to the axis of the shaft 102. In diametrical opposition to the press wheel shaft 122, the cheeks are joined by a transverse member 124 to increase the strength of the crankshaft. The outer cheek 120 is rigidly connected to a transverse shaft 126, journaled at 128 in the right-hand wall 96 and extending outwardly to establish a drive connection 130 to the rearward conveyor 30. This conveyor at its rear end, via drive means 132, drives the wagon elevator 34. For all practical purposes, the gear reduction at 116 may be ignored and it may be assumed that the rotor structure 112 is directly driven by the shaft 102 to rotate in a counterclockwise direction as seen in FIG. 2 (clockwise as seen in FIG. 6).

Figure 5:
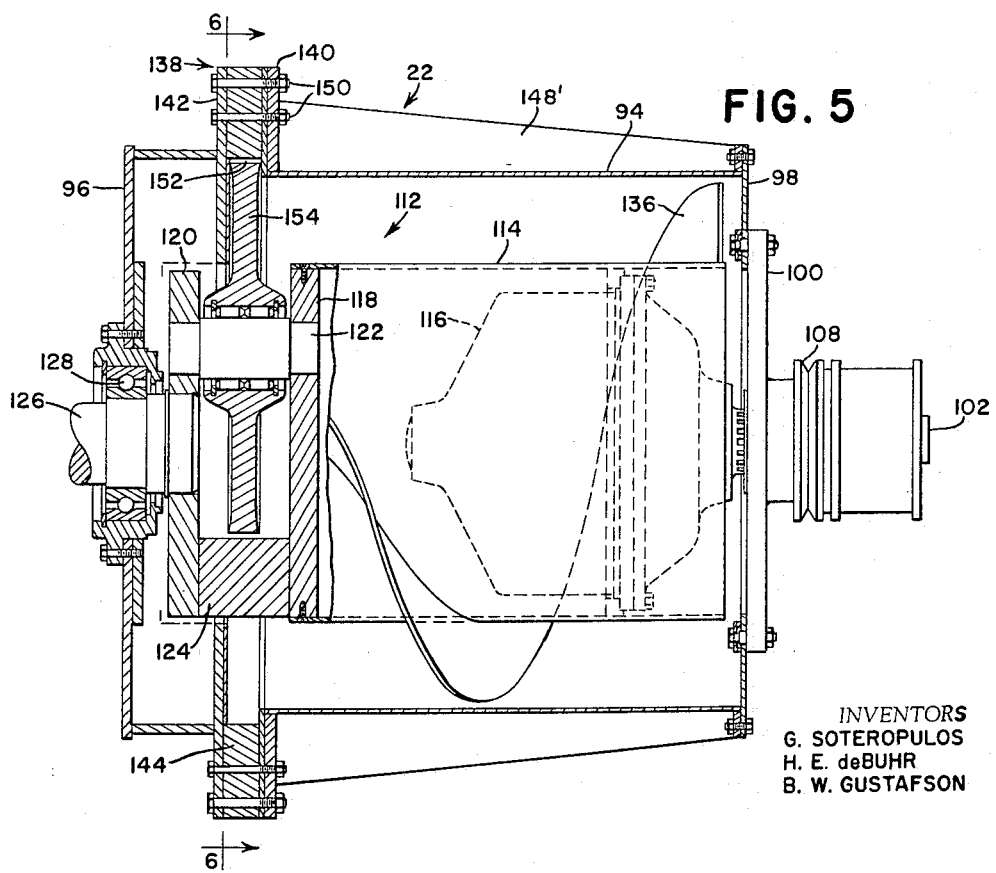
FIG. 5 is an enlarged sectional view as seen along the line 5—5 of FIG. 1.

The housing 94 is provided at its front lower quarter with a feed inlet opening 134 (FIG. 3), which is in crop-transfer relation to the crop-delivery portion 52 of the crop-transfer means 20. The auger core 114 is equipped with an auger or helical flight 136 which operates to move crops axially to the right-hand side of the machine (to the left as seen in FIG. 5). These crops enter the interior of an annular die 138, here made up of a pair of circular rings 140 and 142 and a plurality of uniformly circumferentially spaced blocks or spacers 144 which provide a like plurality of radial die cells 146 (FIG. 6). In FIG. 1, a portion of an annular conical shield 148 has been broken away to illustrate two of the die cells. The purpose of the shield is to break off the extruded wafers, which then fall into the conveyor 30. Various types of breakers are known and therefore only brief reference is made to the breaker cone 148.

The die ring 140 is rigidly secured in any suitable manner to the feed housing 94 and is additionally braced by a plurality of plates 148′. The other ring 142 is rigidly secured in any appropriate manner to the end wall 96 (FIG. 5). In the construction shown, the spacer blocks 144 are rigidly secured between the rings 140 and 142 by a plurality of bolts 150. These details of course may be varied at will, the basic essential being the provision of the died cells 146, which open at their inner ends to a circular track 152, afforded by the inner ends of the blocks 146 and annular portions of the rings 140 and 142, and within which a press wheel 154, journaled on the shaft 122, rolls as the rotor structure 112 rotates. On the basis of the representation shown in FIG. 6, in which the rotor structure turns in a clockwise direction, the axis of the shaft 122 will also turn in that direction, causing the press wheel to roll about the track in the direction of the arrow 156. The terminal end of the auger flight 136 is "timed" with respect to the press wheel 156 so as to deliver material from within the housing 94 just ahead of the press wheel, specifically in the area 158, considering FIG. 6 as a static condition. The "crescent" or bite will of course vary annularly as the structure 112 rotates. The crop thus introduced to the area or crescent 158 is rolled over by the press wheel 154 and successively forced into the inlet ends of the die cells 146. As crops are continually fed to the track, to be rolled over by the press wheel, accumulations occur in the cells, wherein they are compacted in wafer form, ultimately being extruded radially outwardly through the outlet ends of the cells, breaking off by means of the breaker cone 148 to drop into the conveyor 30.

As previously described, field moisture content often falls below a level suitable for adequate wafering, and this problem has heretofore been solved to some extent by the addition of water or some other moisturizing agent to bring the moisture level up to that required. As already pointed out, the prior art utilized a system for adding water or liquid generally in the area of the space occupied by the cutter 62, and in some instances water was added to the area occupied by the auger 136. The disadvantages of these systems have already been described.

Figure 4:
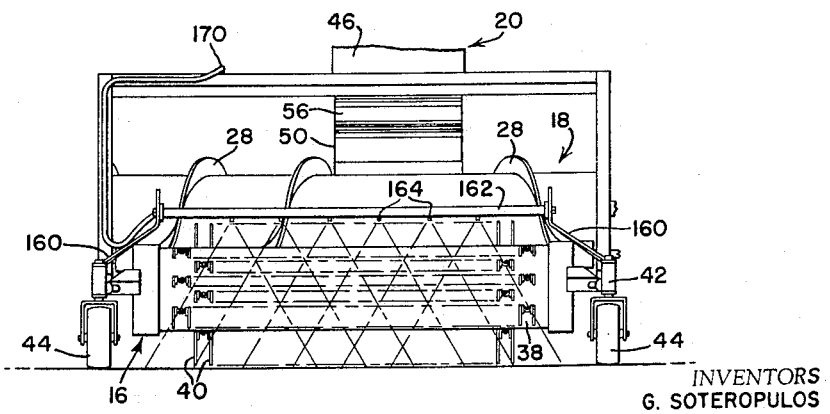
FIG. 4 is a fragmentary front view as seen along the line 4—4 of FIG. 1.

According to the present invention, water or liquid is added to the crop stream at a forward portion of the machine, and preferably to the crops before or at about the time they are picked up by the pick-up 16. That portion of the pick-up frame 42 that carries the caster wheels 44 serves also to mount a pair of uprights 160 which carry between them a transverse water distributor pipe 162. As seen in FIG. 1, the spacing of the supports 160 is such that the pipe 162 can have a length substantially coextensive with the windrow dimension W. It is seen also that the location of the pipe 162 is that it is just ahead of the pick-up means 16. As best shown in FIG. 4, the pipe 162 is equipped with a plurality of nozzles 164, suitably spaced throughout the length of the pipe so as to distribute liquid in the pattern shown by the dot-dash lines. It is preferred that the nozzles be of the "fan" type as distinguished from the cone or fog type. Fan nozzles will distribute water in a transverse plane, when set according to the principles of the present invention. This will distribute the water completely over the entire windrow dimension W and at a point just before the crops are picked up by the pick-up means. In other words, the crops are still in a wide stream state and therefore receive the added moisture before they are subjected to the narrowing action of the means 18 and, primarily, before they are subjected to the action of the crop-transfer means 20. While the crops are lying on the ground in either a windrowed or swath state, they are of course more spread out than they are in the crop-transfer means 20, for example. Therefore, it is found that the added moisture has an opportunity to distribute itself over a wider area of the crops. Since the liquid distribution means, including the pipe 162 and its nozzles 164, is considerably advanced as respects the location of the crop-transfer means 20, the liquid has a better chance to spread itself throughout the crop stream than it would were the liquid added at a more rearward point. In other words, the time interval between the pick up of the crops and the transfer thereof to the die means is increased.

For the purpose of supplying liquid under pressure to the pipe 162 and its nozzles 164, the machine may carry a pump 166, drawing liquid from the tank 24 via a hose 168 and supplying this liquid to the pipe by means of a hose 170. Any suitable form of drive, as at 172 (FIG. 1), may be used to drive the pump.

The addition of moisture or liquid in the manner described has been found to materially improve the quality of the wafers, particularly in combination with the crop-transfer means which moves crops in a relatively uniform stream to the cutter 62 which, as previously described, cuts the crops into short lengths rather than flailing and chewing them. This contributes to the internal structure of the wafer whereby it retains its form and does not deteriorate in further handling. The addition of moisture to the crops in the area noted has further advantages. For example, if the windrow or swath happens to be particularly thin, excess moisture will fall to the ground rather than to portions of the machine and therefore will not be carried into the die as excess moisture that might contribute to slugging. Further, while the crop is still lying on the ground, the stems, being uncut, have greater portions thereof exposed to the added moisture. The avoiding of slugging of the die is important from the standpoint of enabling the machine to continue at a relatively uniform rate of operation. For example, in the case of slugging, the engine becomes overloaded, the machine slows down, and this results in a decrease in speed of the pump, meaning that the liquid output of the pump falls off perhaps at a time when this is undesirable. Therefore, the next batch of crops fed to the die would be overly dry, which would be reflected in poor wafers.

The amount of water to be added and the regulation thereof, as by any suitable valve, is primarily under control of the operator who can, through experience, judge the moisture level by the nature of the wafers moving up the elevator 34. For example, if the moisture level in the windrow falls as low as, say 8%, the addition of water at the rate of, say, 8 to 14 gallons per ton of crops should raise the moisture level to that adequate for wafering.

In the preferred embodiment, the width of the pick up 16 is approximately 80", which is adequate to pick up a windrow of that width or smaller. It is preferred that the crop stream be narrowed by the augers 28 to approximately 20", which is found suitable for feeding through the opening 134 to the die auger 136.

Features and advantages other than those enumerated will readily occur to those versed in the art, as will many modifications and alterations in the preferred embodiment disclosed, all without departure from the spirit and scope of the invention.

What is claimed is:

1. A machine for wafering hay and like forage crops from relatively wide previously formed and at least partly cured windrows, comprising: a mobile frame adapted to travel over the field parallel to the windrows; crop pick-up means carried by the frame and of sufficient width to span a windrow and to pick up crops from such windrow and to move the crops rearwardly in a relatively wide stream; crop-wafering means on the frame in spaced relation to the pick-up means; crop-transfer means on the frame between the pick-up means and the wafering means and having a receiving portion proximate to and for receiving crops from the pick-up means, a delivery portion proximate to and for delivering crops to the wafering means, and feed means for moving crops from the receiving portion to the delivery portion; means on the frame including a container for carrying a crop-wetting liquid; and means on the frame and connected to the container and disposed in proximity to the pick-up means for distributing liquid to the crops over a relatively wide area prior to movement of the crop stream into the aforesaid receiving portion.

2. The invention defined in claim 1, in which: the receiving portion includes means for narrowing the stream of crops subsequent to wetting of the crops.

3. The invention defined in claim 1, in which: the feed means includes a pair of cooperating feed rolls for effecting the feeding of crops to the delivery portion.

4. The invention defined in claim 1, in which: the feed means includes cutting means comprising a cutter rotatable on a transverse axis and having at least one transverse blade and a fixed transverse blade cooperative with the cutter blade to cut the crops into relatively short lengths prior to delivery to the wafering means.

5. The invention defined in claim 1, in which: the liquid distributing means is substantially coextensive in width with the pick-up means and is located so as to wet the crops just prior to pick-up thereof by the pick-up means.

6. The invention defined in claim 1, in which: the feed means includes a pair of cooperating feed rolls for effecting the feeding of crops to the delivery portion and the delivery portion includes cutting means comprising a cutter rotatable on a transverse axis and having at least one transverse blade and a fixed transverse blade cooperative with the cutter blade to cut the crops into relatively short lengths prior to delivery to the wafering means.

7. A machine for wafering hay and like forage crops from a field bearing such crops in a previously cut and at least partly cured condition, comprising: a mobile frame adapted to advance over the field; crop pick-up means carried by the frame and of substantial width relative to the line of advance and operative to pick-up and to move rearwardly a comparably wide stream of crops; crop-wafering means on the frame in spaced relation to the pick-up means; crop-transfer means on the frame between the pick-up means and the wafering means and having a receiving portion proximate to and for receiving crops from the pick-up means, a delivery portion proximate to and for delivering crops to the wafering means, and feed means for moving crops from the receiving portion to the delivery portion; means on the frame including a container for carrying a crop-wetting liquid; and means on the frame and connected to the container and disposed in proximity to the pick-up means for distributing liquid to the crops substantialy throughout the entire width of the stream prior to movement of the crop stream into the aforesaid receiving portion.

8. The invention defined in claim 7, in which: the receiving portion includes means for narrowing the stream of crops subsequent to wetting of the crops.

9. The invention defined in claim 7, in which: the feed means includes cutting means comprising a cutter rotatable on a transverse axis and having at least one transverse blade and a fixed transverse blade cooperative with the cutter blade to cut the crops into relatively short lengths prior to delivery to the wafering means.

10. The invention defined in claim 7, in which: the liquid distributing means is substantially coextensive in width with the pick-up means and is located so as to wet the crops just prior to pick-up thereof by the pick-up means.

11. A machine for wafering hay and like forage crops from a field bearing such crops in a previously cut and at least partly cured condition, comprising: a mobile frame adapted to advance over the field; crop pick-up means carried by the frame and of substantial width relative to the line of advance and operative to pick-up and to move rearwardly a comparably wide stream of crops; crop-wafering means on the frame in spaced relation to the pick-up means; crop-transfer means on the frame between the pick-up means and the wafering means and having a receiving portion proximate to and for receiving crops from the pick-up means, a delivery portion proximate to and for delivering crops to the wafering means, and feed means for moving crops from the receiving portion to the delivery portion; and cutting means associated with the crop-transfer means and including a cutter rotatable on a transverse axis and having at least one transverse blade and a fixed transverse blade cooperative with the cutter blade to cut the crops into relatively short lengths prior to delivery to the wafering means.

References Cited by the Examiner

UNITED STATES PATENTS

| | | | |
|---|---|---|---|
| 2,716,317 | 8/1955 | McClellan | 56—1 |
| 3,139,717 | 7/1964 | Fischer | 56—1 X |
| 3,218,786 | 11/1965 | Johnson et al. | 56—1 |

ABRAHAM G. STONE, *Primary Examiner.*

ANTONIO F. GUIDA, *Examiner.*